(12) United States Patent
Fourney

(10) Patent No.: US 8,225,922 B1
(45) Date of Patent: Jul. 24, 2012

(54) TRANSVERSE DRIVEN-ROLLER BELT AND CONVEYOR

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/044,981

(22) Filed: Mar. 10, 2011

(51) Int. Cl.
*B65G 47/46* (2006.01)

(52) U.S. Cl. .................................. 198/370.09; 198/779

(58) Field of Classification Search ............. 198/781.08, 198/370.09, 371.3, 779
See application file for complete search history.

(56) References Cited

U.S. PATENT DOCUMENTS

| | | | | |
|---|---|---|---|---|
| 1,852,942 | A * | 4/1932 | Streine | 198/779 |
| 3,040,379 | A * | 6/1962 | Bayer | 198/779 |
| 3,675,760 | A * | 7/1972 | Burrage et al. | 198/779 |
| 3,715,024 | A * | 2/1973 | Mumma | 198/779 |
| 4,293,064 | A | 10/1981 | Robinson | |
| 5,190,137 | A | 3/1993 | Tas | |
| 7,249,669 | B2 * | 7/2007 | Fourney | 198/370.09 |
| 7,357,246 | B2 | 4/2008 | Costanzo | |
| 7,360,641 | B1 | 4/2008 | Fourney | |
| 7,461,739 | B2 | 12/2008 | Fourney | |
| 7,533,766 | B1 | 5/2009 | Fourney | |
| 7,537,106 | B2 | 5/2009 | Fourney | |
| 7,540,368 | B2 | 6/2009 | Weiser | |
| 7,556,136 | B2 * | 7/2009 | Marshall et al. | 198/370.09 |
| 7,588,137 | B2 | 9/2009 | Fourney | |

FOREIGN PATENT DOCUMENTS

WO   2010107823 A1   9/2010

OTHER PUBLICATIONS

ISA/EP, International Search Report and Written Opinion of the International Searching Authority of International Patent Application No. PCT/US12/27805, mailed May 25, 2012, European Patent Office, Rijswijk, NL.

* cited by examiner

*Primary Examiner* — James R Bidwell
(74) *Attorney, Agent, or Firm* — James T. Cronvich

(57) ABSTRACT

A transverse-roller conveyor belt and a conveyor system providing a drive mechanism for driving the rollers in the belt to divert conveyed articles. The conveyor belt includes belt rollers that each engage a pair of smaller-diameter, article-conveying rollers. The conveyor system's drive mechanism, when selectively actuated, rotates the belt rollers, which rotate the article-supporting rollers to divert conveyed articles toward or off the side of the belt. Gaps between at least some of the pairs of article-supporting rollers admit the teeth of a transfer comb to strip remaining articles off the downstream end of the belt.

14 Claims, 2 Drawing Sheets

TRANSVERSE DRIVEN-ROLLER BELT AND CONVEYOR

BACKGROUND

The invention relates generally to power-driven conveyors and more particularly to conveyor systems having belts with article-supporting rollers actuated to divert articles toward a side of the belt.

Some conveyor belts include rollers that can be rotated to divert articles toward one side of the belt or the other. In the INTRALOX® Series 7000 Transverse Roller belt, the rollers are arranged with their axes of rotation aligned with the direction of belt travel. The rollers extend beyond top and bottom surfaces of the belt. A drive mechanism engages the rollers below the bottom surface of the belt and causes the rollers to rotate and divert articles across the width of the belt. The rollers in the INTRALOX® Series 7000 belt are separated transversely by belt structure that has drive recesses on a bottom surface for receiving the teeth of drive and idle sprockets. The belt structure separating the rollers limits the minimum transverse spacing of the rollers and the contact area available for supporting articles atop the rollers.

SUMMARY

These limitations are addressed by a conveyor belt embodying features of the invention. One version of such a belt comprises a first set of rollers supporting a second set of rollers. The first rollers are arranged to rotate on axes oriented in a direction of belt travel. The second rollers, which are supported atop the first rollers, have axes of rotation parallel to the axes of the first rollers. Each of the first rollers contacts a pair of the second rollers flanking the first roller.

In another aspect of the invention, a conveyor system comprises a conveyor belt as described in the preceding paragraph and a drive mechanism underlying the conveyor belt. The drive mechanism engages the first rollers to rotate them in a first direction perpendicular to the direction of belt travel. The first rollers, in turn, rotate the second rollers in a second direction opposite to the first direction.

BRIEF DESCRIPTION OF THE DRAWINGS

These aspects and features of the invention, as well as its advantages, are described in more detail in the following description, appended claims, and accompanying drawings, in which:

DETAILED DESCRIPTION

Figure 1:
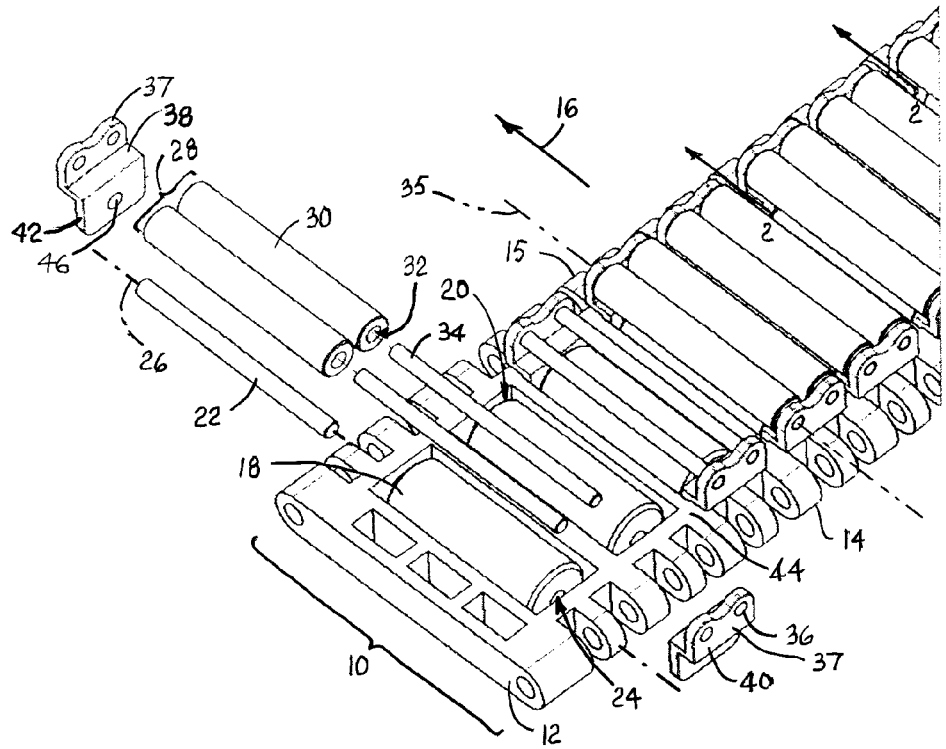
FIG. 1 is a partly exploded view of a portion of one row of a modular plastic conveyor belt embodying features of the invention.

A portion of one row of a modular conveyor belt embodying features of the invention is shown in FIG. 1. The belt row 10 comprises one or more belt modules 12 arranged side by side. Each module extends from a first end 14 to an opposite second end 15 in a direction of belt travel 16. Belt rollers 18 reside in cavities 20 formed in the belt module between the first and second ends. An axle 22 extending through a bore 24 in each belt roller defines an axis of rotation 26 for the belt roller. The axis of rotation 26 is parallel to the direction of belt travel 16. The axles of all the belt rollers 18 in the belt row 10 lie in a common plane.

Mounted atop each belt roller 18 is a pair 28 of article-supporting rollers 30 of substantially the same length as the belt rollers. Because there are more article-supporting rollers 30 than belt rollers 18, the article-supporting rollers provide more contact area for conveyed articles than would the belt rollers 18 in a belt without the pairs of article-supporting rollers 30. The peripheries of the rollers contacting each other may be made of high-friction materials for good engagement. The article-supporting rollers alternatively can be made of materials producing a low-friction or durable periphery. Bores 32 through the article-supporting rollers 30 receive axles 3, which define axes of rotation 35 parallel to the axes 26 of the belt rollers 18. The ends of the axles are pressed-fitted in upper openings 36 formed in stanchions 37 extending upward from the seats 38 of supports 40. The axles can be corrosion-resistant, plain, or hardened steel, for example. The supports each have a lower leg 42 extending downward from the opposite end of the seat 38. The lower legs 40 reside in the belt-roller cavities 20 at opposite ends. The seats 38 sit on the top surface 44 of the belt module 12. A hole 46 through each leg 42 of the support 40 receives the axle 34 of the article-supporting roller 30. The axle 34 retains the support 40 in the cavity. The lateral (widthwise) dimension of the cavities 20 is only slightly greater than the lateral dimension of the support legs. In this way, the supports are prevented from rotating in the cavities.

Figure 2:
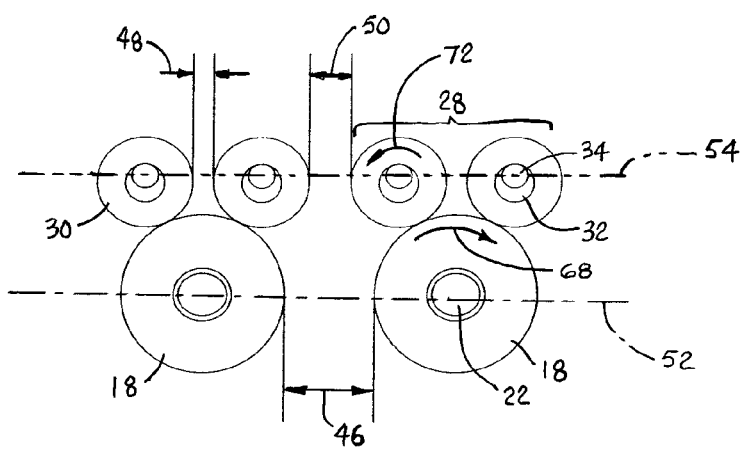
FIG. 2 is a cross section of a portion of the conveyor belt of FIG. 1 taken along lines 2-2.

As shown in FIG. 2, the belt rollers 18 are separated from each other across a first gap 46. The article-supporting rollers 30 of each pair 28 atop a common belt roller are separated by a second gap 48. The pairs 28 of article-supporting rollers are separated from their neighboring pair by a third gap 50. The first gaps 46 are wider than the third gaps 50. At least some of the third gaps 50 are wider than the second gaps 48. The rest of the third gaps can have the same width as the second gaps for a more uniform roller arrangement. The diameter of the belt rollers 18 is greater than the diameter of the article-supporting rollers 30. Furthermore, the bores 32 through the article-supporting rollers 30 have a diameter large enough in relation to the diameter of the axles 34 to provide a degree of clearance that ensures that the article-supporting rollers float on their axles to maintain their peripheries in uniform contact with the peripheries of the belt rollers to compensate for roller wear and manufacturing tolerances in the positioning of the axles 22, 34. Just as the axes of the belt rollers 18 lie in a common plane 52, the axes of the article-supporting rollers 30 lie in a parallel common plane 54 above the plane of the belt roller.

Figure 3:
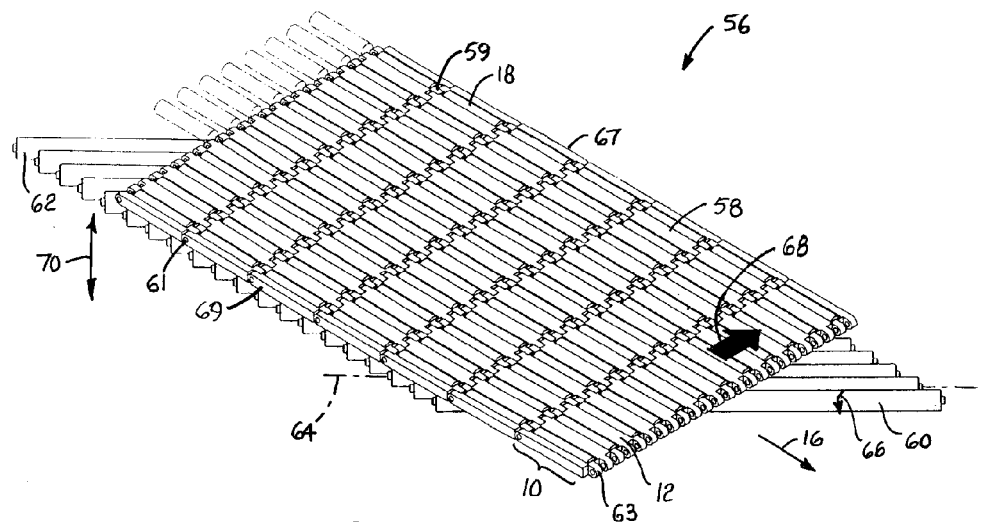
FIG. 3 is an isometric view of a carryway portion of a conveyor system using a conveyor belt as in FIG. 1 with the article-supporting rollers removed for clarity.

A carryway portion of a conveying system 56 having a conveyor belt 58 constructed of rows 10 of belt modules 12 as in FIG. 1 is shown in FIG. 3 with the article-supporting rollers removed for simplicity. Adjacent rows are joined at hinge joints 59 by hinge rods 61 through interleaved hinge elements 63 at the ends of each row. The conveyor belt 58 is shown advancing in the direction of belt travel 16 along a carryway path. A drive mechanism 60 in the form of a planar array of passive actuating rollers 62 that rotate on axes 64 oblique to the direction of belt travel 16 into the axes of the belt rollers 18. As the conveyor belt advances in the direction of belt travel, the freely rotatable belt rollers 18, which have salient portions protruding below the bottom of the conveyor belt, engage the freely rotatable, oblique actuating rollers 62. The forward motion of the belt causes the oblique rollers 62 to rotate as indicated by arrow 66 and the belt rollers 18 to rotate toward a first side 67 of the belt as indicated by arrow 68. The belt rollers 18 can be rotated in the opposite direction toward an opposite second side 69 of the belt by reorienting the oblique actuating rollers 62 so that their axes 64 extend obliquely from the first side 67 downstream to the second side 69 of the belt. And, as shown in FIG. 2, rotating the belt rollers 18 toward the first side of the belt causes the article supporting rollers 36 to rotate in the opposite direction 72. The actuating roller array 60 can also be selectively disengaged from the belt rollers 18 by an actuator raising and lowering the array, as indicated by two-headed arrow 70. When the roller array is disengaged, the belt rollers 18 and the article-supporting rollers 30 are not actively driven by the forward motion of the belt 58, and conveyed articles supported atop the article-supporting rollers are not diverted toward either side of the belt.

Figure 4:
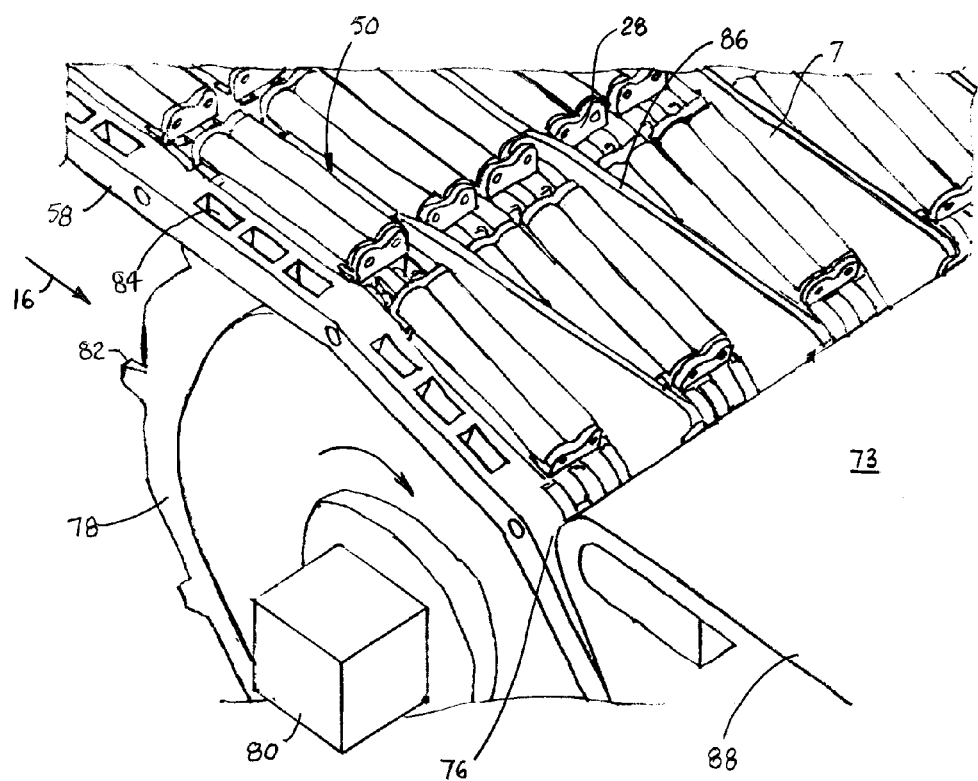
FIG. 4 is an isometric view of an outfeed end of the carryway portion of the conveyor system of FIG. 3.

As shown in FIG. 4, articles not diverted off either side of the conveyor belt 58 are stripped from the belt by a transfer comb 73 having teeth 74 that fit into the wider third gaps 50 between, in the example of FIG. 4, every other pair 28 of article-supporting rollers 30. The transfer comb 73 is positioned at an outfeed end 76 of the carryway. At the outfeed end 76, the conveyor belt transitions from the upper carryway to a lower returnway around a reversing element, in this example, a set of sprockets 78 mounted on a shaft 80. The shaft may be a drive shaft conventionally rotated by a motor. Sprocket teeth 82 received in receptacles 84 formed in the belt drive the belt in the direction of belt travel 16. Articles conveyed atop the article-supporting rollers 30 are pushed across top surfaces 86 of the comb teeth 74 and onto a transfer plate 88 at the outfeed end of the carryway as the belt 58 transitions downward to the returnway.

Although the invention has been described in detail with respect to an exemplary version, other versions are possible. For example, the conveyor belt shown is a modular plastic conveyor belt having belt and article-supporting rollers. But the conveyor belt can be a flat, hingeless belt with two sets of rollers, or it can be an array of two sets of rollers supported at opposite ends by roller chain. As another example, the drive mechanism for the rollers can alternatively be realized as an array of short caster rollers rather than the long actuating rollers shown in FIG. 3. And the caster rollers can be rotated about vertical axis into non-actuating positions with their axes perpendicular to the direction of belt travel, allowing the belt rollers to ride along the caster array without rotation. As yet another example, the wider gaps between article-supporting roller pairs that accommodate the teeth of a transfer comb could be positioned between each pair of article-supporting rollers or between every third pair, and so on, depending on the desired tooth density. And the reversing element may be idle or drive sprockets, pulleys, or drums. So, as these few examples suggest, the scope of the claims is not meant to be limited to the exemplary embodiments described in detail.

What is claimed is:

1. A conveyor belt comprising:
   a plurality of first rollers arranged to rotate on axes oriented in a direction of belt travel, the first rollers having a first diameter;
   a plurality of second rollers supported atop the first rollers and having axes of rotation parallel to the axes of the first rollers, wherein each of the first rollers contacts a pair of the second rollers flanking the first roller.
2. A conveyor belt as in claim 1 wherein the second rollers have a second diameter less than the first diameter of the first rollers.
3. A conveyor belt as in claim 1 wherein the first rollers are arranged in a plurality of rows spaced apart in the direction of belt travel, wherein each row includes more than one of the first rollers spaced apart along the width of the conveyor belt with first gaps between adjacent first rollers and wherein the second rollers of each pair contacting the same one of the first rollers are separated by a second gap and each pair of second rollers is separated from an adjacent pair of second rollers by a third gap.
4. A conveyor belt as in claim 3 wherein at least some of the third gaps are wider than the second gaps.
5. A conveyor belt as in claim 3 wherein the first gap is wider than the second and third gaps.
6. A conveyor belt as in claim 1 further comprising a plurality of axles and wherein the second rollers each have a bore for receiving one of the axles for rotation, wherein the diameter of the bores is greater than the diameter of the axles by an amount sufficient to allow the second rollers to float on the axles and remain in contact with the corresponding first rollers as the diameters of the first and second rollers decrease with wear.
7. A conveyor belt as in claim 1 further comprising:
   a top surface and an opposite bottom surface defining the thickness of the conveyor belt;
   first axles on which the first rollers are mounted for rotation having opposite ends retained between the top and bottom surfaces; and
   second axles on which the second rollers are mounted for rotation.
8. A conveyor belt as in claim 7 further comprising a plurality of pairs of supports upstanding from the top surface, each pair of supports supporting one pair of the second rollers.
9. A conveyor belt as in claim 7 further comprising a plurality of supports, each support having a single lower hole and a pair of upper openings flanking the lower hole from above, wherein each of the supports is retained in the conveyor belt by one of the ends of one of the first axles extending through the lower hole, and wherein each of the upper openings receives an end of one of the second axles.
10. A conveyor belt as in claim 1 further comprising:
    a top surface and an opposite bottom surface defining the thickness of the conveyor belt;
    wherein salient portions of the first rollers protrude past the top and bottom surfaces and wherein the second rollers are supported above the top surface by the first rollers.
11. A conveyor system comprising:
    a conveyor belt including:
      a plurality of first rollers arranged to rotate on axes oriented in a direction of belt travel, the first rollers having a first diameter;
      a plurality of second rollers supported atop the first rollers and having axes of rotation parallel to the axes of the first rollers, wherein each of the first rollers contacts a pair of the second rollers flanking the first roller; and
    a drive mechanism underlying the conveyor belt that engages the first rollers to rotate the first rollers in a first direction perpendicular to the direction of belt travel, wherein the first rollers rotate the second rollers in a second direction opposite the first direction.
12. A conveyor system as in claim 11 wherein the second rollers have a second diameter less than the first diameter of the first rollers.
13. A conveyor system as in claim 11 wherein the first rollers are arranged in a plurality of rows spaced apart in the direction of belt travel, wherein each row includes more than one of the first rollers spaced apart along the width of the conveyor belt with first gaps between adjacent first rollers and wherein the second rollers of each pair contacting the same one of the first rollers are separated by a second gap and each pair of second rollers is separated from an adjacent pair of second rollers by a third gap.

14. A conveyor system as in claim 13 further comprising a reversing element about which the conveyor belt transitions from an upper carryway to a lower returnway and a transfer comb having teeth that extend into at least some of the third gaps along the upper carryway proximate the reversing element to strip articles conveyed atop the second rollers from the conveyor belt.

* * * * *